United States Patent [19]

Schulz-Hennig et al.

[11] Patent Number: 4,694,150

[45] Date of Patent: Sep. 15, 1987

[54] METHOD AND APPARATUS FOR ACOUSTIC SUPERVISION OF ADJUSTMENT OPERATIONS AT OPTICAL DEVICES

[75] Inventors: Joerg Schulz-Hennig, Heikendorf; Horst Sievers, Preetz, both of Fed. Rep. of Germany

[73] Assignee: Dr. Ing. Rudolf Hell GmbH, Fed. Rep. of Germany

[21] Appl. No.: 743,516

[22] Filed: Jun. 11, 1985

[30] Foreign Application Priority Data

Jun. 18, 1984 [EP] European Pat. Off. ....... 84 106945.3

[51] Int. Cl.[4] .............................................. G01J 1/20
[52] U.S. Cl. .................................. 250/201; 356/153; 356/400
[58] Field of Search ............... 250/201, 203; 356/400, 356/141, 158, 153

[56] References Cited

U.S. PATENT DOCUMENTS

| | | | |
|---|---|---|---|
| 3,907,435 | 9/1975 | Roodvoets | 356/152 |
| 3,972,622 | 8/1976 | Mason et al. | 356/400 |
| 4,081,216 | 3/1978 | Cook | 356/256 |
| 4,126,834 | 11/1978 | Coppock | 332/7.51 |

FOREIGN PATENT DOCUMENTS

| | | |
|---|---|---|
| 2850743 | 5/1980 | Fed. Rep. of Germany . |
| 3151834 | 8/1982 | Fed. Rep. of Germany . |
| 428322 | 1/1975 | U.S.S.R. .............................. 356/141 |

OTHER PUBLICATIONS

Applied Optics, vol. 18, No. 17, Sep. 1, 1979 "Acoustooptic Modulator Intensity Servo" by Howard P. Layer, pp. 2947-2949.

Primary Examiner—David C. Nelms
Assistant Examiner—Crystal D. Cooper
Attorney, Agent, or Firm—Hill, Van Santen, Steadman & Simpson

[57] ABSTRACT

A method and apparatus for acoustic supervision of adjustment of a light bundle with respect to its intensity distribution in a reference plane which is at right angles to the optical axis of the light bundle. The reference plane is subdivided into surface elements. The intensity values corresponding to a rated intensity distribution are prescribed and stored for the individual surface elements of the reference plane. The intensity values for the individual surface elements respectively existing in the adjustment are successively measured in rapid cyclical succession. The intensity deviation from the prescribed intensity value is identified and stored for each surface element. The stored intensity values are read-out in slow cyclical succession and are made audible as measuring tones for the supervision of the adjustment.

17 Claims, 2 Drawing Figures

METHOD AND APPARATUS FOR ACOUSTIC SUPERVISION OF ADJUSTMENT OPERATIONS AT OPTICAL DEVICES

RELATED APPLICATIONS

The inventors of this application have also filed the following related applications: "Method And Apparatus For Acoustic Supervision of Adjustment Operations At Optical Devices", Ser. No. 743,370, filed June 11, 1985; and "Method and Apparatus For Acoustic Supervision of Adjustment Operations At Optical Devices", Ser. No. 743,514, filed June 11, 1985.

BACKGROUND OF THE INVENTION

The present invention relates to the fields of imaging optics and laser optics, and relates to optical apparatus wherein the intensity distribution in a light bundle, particularly in a laser light bundle, must be adjusted at right angles relative to the optical axis of the light bundle with respect to a reference plane situated in the beam path.

The intensity distribution, the attitude, or direction of a light bundle is influenced by optical components such as mirrors, reflecting prisms, lenses, optically transparent plane-parallel plates and wedge plates, groove grating, holographic deflector diaphragms, acoustic multi-frequency modulators, or acousto-optical reflectors. Finally, the light source itself can also be moved. The adjustment of a light bundle with respect to its intensity distribution, its attitude, or its direction occurs by means of suitable adjustment means in the form of mechanical adjustments such as, for example mirror mounts, or in the form of electro-mechanical adjustments such as, for example, piezodrives.

It is known for supervising the adjustment of a light bundle to observe gauges, such as targets or apertured diaphragms, or to make the signals of suitable photodetectors visible, for example, on an oscilloscope.

In many instances, however, the known adjustment aids are not precise enough, sometimes do not supply unequivocal information regarding an optimal adjustment, and are occasionally also difficult to manipulate. Due, for example, to the exposed position of an adjustment means or the compact structure of an optical apparatus, it is frequently not possible to undertake a precise observation or supervision of the accomplished adjustment simultaneously during the adjustment operation.

SUMMARY OF THE INVENTION

It is therefore an object of the present invention to specify a method and a device for acoustic supervision of intensity distribution in a light bundle at right angles relative to an optical axis of the light bundle relative to a reference plane situated in the beam path. With the invention, the adjustment can be more easily and precisely executed and the required steps for an optimum adjustment can be defined in terms of size and direction.

According to the method of the invention for acoustic supervision of adjustment of a light bundle with respect to its intensity distribution in a reference plane which is at right angles to an optical axis of the light bundle, the reference plane is sub-divided into surface elements and a desired intensity value is prescribed and retained for every surface element. Intensity values of the light bundle existing during the adjustment are measured in the individual surface elements in fast, cyclical succession. Intensity deviations between the desired and actual intensity values are identified and intermediately stored for the individual surface elements. The intensity deviations are successively read out in slow, cyclical succession. An oscillation is generated, and at least one parameter of the oscillation is modified dependent on the respective intensity deviation in the individual surface elements. The modified oscillation is made audible as a corresponding measuring tone for every surface element of the reference plane.

DESCRIPTION OF THE PREFERRED EMBODIMENTS

Figures 1, 2:
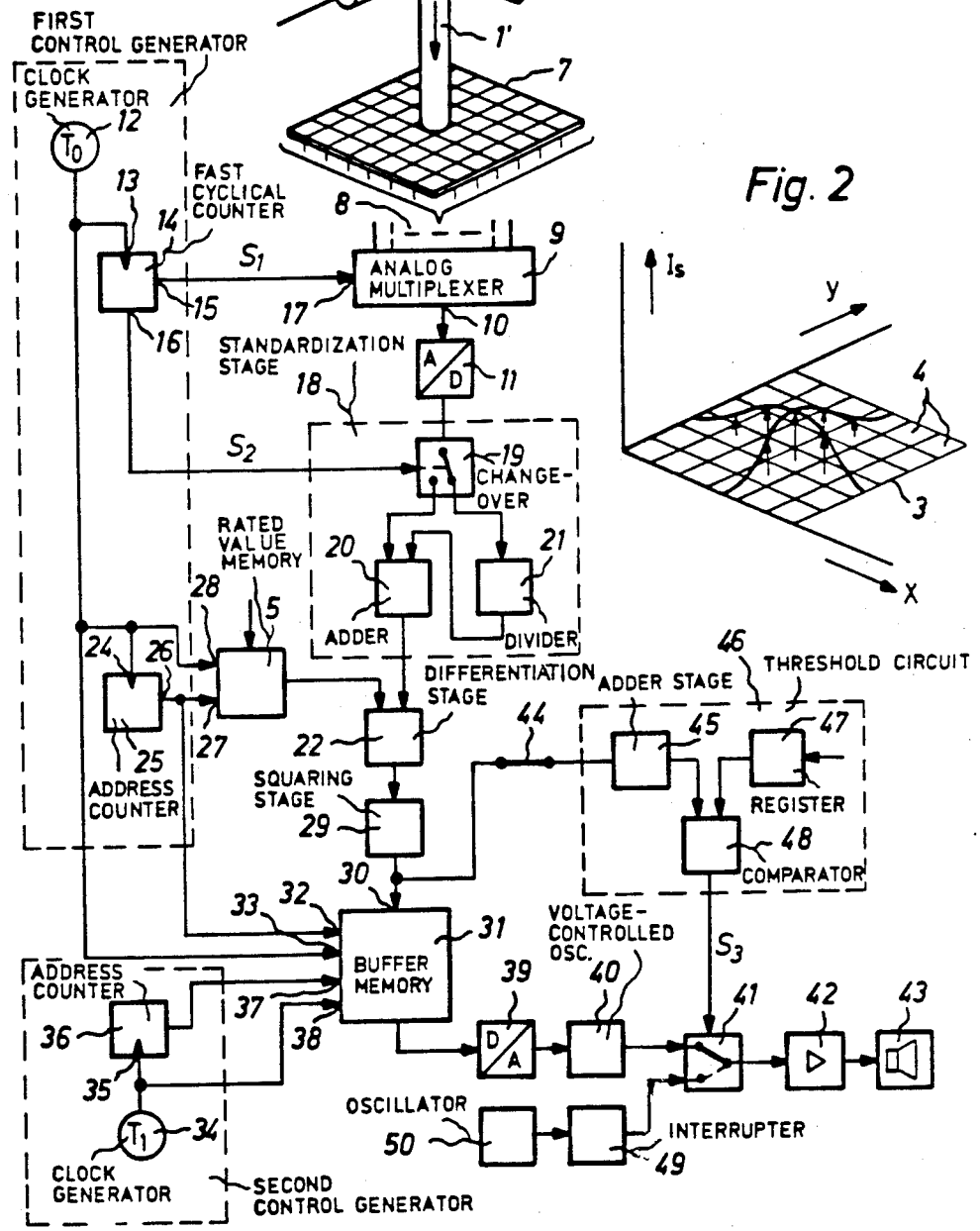
FIG. 1 is an exemplary embodiment of a device for acoustic supervision of a light bundle adjustment with respect to its intensity distribution in a prescribed reference plane.
FIG. 2 is a graphic illustration of a desired intensity distribution in the reference plane.

FIG. 1 shows an exemplary embodiment of a device for acoustic monitoring or supervision of the adjustment of a light bundle, for example of a laser light bundle, with respect to its intensity distribution in a prescribed reference plane at right angles relative to the optical axis of the light bundle.

A light bundle 1, whose light source and adjustment means are not shown, should have a specific location-dependent intensity distribution $I_s = f(x,y)$ in a prescribed reference plane 3 lying at right angles relative to the optical axis 2 of the light bundle 1. An example of a desired intensity distribution in the reference plane 3 is shown in FIG. 2 in which the rate intensity values $I_s$ for the individual surface elements 4 of the plane 3 defined by coordinate values x and v are illustrated as a 3-dimensional function. The rated intensity values $\overline{I} = f(x,y)$ required for the desired intensity distribution are callable from a storage where they are stored in standardized form in a rated value memory 5 of the supervision means for the individual surface elements 4 of the reference plane 3.

A change in the intensity distribution in the ray bundle 1 can, for example, be achieved by shifting lenses or prisms in the beam path of the light bundle 1.

For measuring the respectively existing intensity distribution $I_i = f(x,y)$ before the beginning of or during the adjustment operation, a partially transmitting planar mirror 6 (beam splitter) is situated in the beam path of the light bundle 1, a sub-light-bundle 1' being mirrored out therewith and cast onto a light measuring surface 7 of the monitoring means. The light measuring surface 7 and the reference surface 3 have the same distance from the planar mirror 6. The light measuring surface 7 is, for example, a photodiode matrix with n surface-disposed photodiodes, whereby each surface element 4 within the reference plane 3 has a photodiode coinciding positionally within the photodiode matrix allocated to it, so that the individual output signals of the photodiodes correspond to the measured, location-dependent actual intensity values $I_i = f(x,y)$ for the surface elements 4 of the reference plane 3. The light measuring surface 7, of course, can also be disposed in the beam path of the light bundle 1.

The n actual intensity values $I_i$ measured in the light measuring surface 7 are forwarded to the inputs 8 of an analog multiplexer 9 which connects through the individual actual intensity values $I_i$ successively in cyclical sequence via its output 10 to a following A/D converter 11.

For controlling the analog multiplexer 9, a clock generator 12 generates a clock sequence $T_0$ which is counted in via a clock input 13 into a fast cyclical counter 14. A digital control signal $S_1$ with n different bit combinations arises at the data output 15 of the fast cyclical counter 14. These bit combinations respectively repeat in the individual measuring cycles after n clocks of the clock sequence $T_0$ have been counted in. Simultaneously, a control signal $S_2$ "end of measuring cycle" respectively appears at the end of a measuring cycle at a signal output 16 of the counter 14. The digital control signal $S_1$ is forwarded to a control input 17 of the analog multiplexer 9 for the connection through of the measured actual intensity values $I_i$ in the individual measuring cycles, whereby the actual intensity value $I_i$ of a defined surface element 4 of a reference plane 3 is connected through to the A/D converter 11 with every bit combination of the control signal $S_i$.

The actual intensity values $I_i$ of the individual surface elements 4 digitized in the A/D converter 11 are standardized in a standardization stage 18 in the illustrated exemplary embodiment, since, in most cases, it is not the absolute but the relative intensity distribution which is of interest. The standardization stage 18 is composed of an electronic change-over 19 symbolized by a mechanical switch, of an adder stage 20 with a digital adder and an intermediate sum memory, and of a division stage 21. The electrical change-over 19 is respectively switched over at the end of a measuring cycle by the control signal $S_2$ "end of measuring cycle" generated in the counter 14 at the end of a measuring cycle. As a result thereof, for example, the individual actual intensity values $I_i$ in every even-numbered measuring cycle are forwarded to the adder stage 20, are added up in the digital adder, the sum value $\Sigma I_i$ is deposited in the internal register, and the intermediate sum memory of the digital adder is reset. The standardized actual intensity values $I_i$ in every odd-numbered measuring cycle are formed in the division stage 21 by division of the individual actual intensity values $I_i$ by the stored sum value $\Sigma I_i$. The standardized actual intensity values $\bar{I}_i$ are successively output for every surface element 4 and are supplied to a differentiation stage 22. A magnitude of the frequency of the clock frequency $T_0$ counted into the counter 14 is selected such that the measured intensity values $I_i$ of two successive measuring cycles change only slightly during the adjustment operation of the light bundle 1.

The clock sequence $T_0$ acquired in the clock generator 12 is simultaneously counted into an address counter 25 via a clock input 24. The address counter 25 is set such that it calls in the corresponding addresses for the individual, standardized rated intensity values $\bar{I}_s$ via its address output 26, and via the address input 27 of the rated value memory 5 only in each evennumbered measuring cycle. Accordingly, the clock sequence $T_0$ connected to the read-instruction input 28 of the rated value memory 5 is employed as a read clock sequence.

Synchronous with the formation of the standardized actual intensity values $\bar{I}_i$ for the individual surface elements 4 within the uneven measuring cycles, the standardized rated intensity values $\bar{I}_s$ from the rated value memory 5 are read out. Also, the intensity deviations, that is, the differential intensity values $\Delta \bar{I} = f(x,y)$ between rated and actual intensity values, are identified for the individual surface elements 4 of the reference plane 3. For this purpose, the rated value memory 5 and the standardization stage 18 are connected to a differentiation stage 22 in which the differential intensity values $\Delta \bar{I}$ are formed. The differential intensity values $\Delta \bar{I}$ are advantageously modified according to a function, and squared in the exemplary embodiment in a following squaring stage 29, so that the operational sign of the differential values is eliminated and the evaluation of the fluctuations becomes more favorable.

The squared differential values $(\Delta \bar{I})^2$ are written via a data input 30 into a buffer memory 31 and are intermediately stored there. For writing the quadratic differential values $(\Delta \bar{I})^2$, the address counter 25 simultaneously calls in the addresses of the buffer memory 31 via the write address input 32, while the clock sequence $T_0$ is forwarded as a write clock sequence to the write instruction input 33 of the buffer memory 31.

The squared differential values $(\Delta \bar{I})^2$ intermediately stored in the buffer memory 31 are read out of the buffer memory 31 in slow cycles, for example with a cycle time of one second. For this purpose, a clock generator 34 generates a clock sequence $T_1$ which is forwarded to the clock input 35 of a slow, cyclical address counter 36. The address counter 36 generates the read addresses which are supplied to the read address input 37 of the buffer memory 31. The clock sequence $T_1$ employed as a read clock sequence is supplied to the buffer memory 31 via the read instruction input 38.

The read-out digital, squared differential intensity values $(\Delta \bar{I})^2$ are converted into analog voltage values in a following D/A converter 39. These analog voltage values represent a measure of the squared deviations of the actual intensity distribution from the rated intensity distribution.

In a following method step, a periodic oscillation is generated whose frequency, amplitude, keying frequency or pulse duty factor is modified by the squared differential intensity values $(\Delta \bar{I})^2$. The modified oscillation is then converted into a corresponding measuring tone whose pitch, volume, interrupter frequency, or interruption duration depend on the respective, squared differential intensity values $(\Delta \bar{I})^2$. In the selected exemplary embodiment, the frequency of the oscillation, and thus the pitch of the measuring tone, is varied as a function of the identified, squared differential intensity values $(\Delta \bar{I})^2$. For this purpose, a voltage-controlled oscillator 40 (VCO) is provided, the squared differential intensity values $(\Delta \bar{I})^2$ being supplied thereto as a control signal. The voltage-controlled oscillator 40 generates a sinusoidal output oscillation whose frequency depends on the input control signal. The output oscillation of the voltage-controlled oscillator 40 is forwarded to an amplifier 42 via an electronic change-over 41 again symbolized as a mechanical change-over, is amplified there, and is made audible as a measuring tone by means of an electro-acoustical transducer in the form, for example, of a loudspeaker 43. The relationship between the squared differential intensity values $(\Delta \bar{I})^2$ and pitch is undertaken, for example, such that the pitch of the measuring tone becomes lower with decreasing squared differential intensity values. Since the individual, squared differential intensity values $(\Delta \bar{I})^2$ are read out of the buffer memory 31 in, for example, one second spacing, the individual measuring tones for the surface elements 4 of the reference plane 3 are also generated in one second spacing. Given the acoustic supervision of the adjustment of the light bundle 1, thus a high measuring tone is generated given a surface element 4 having a great intensity deviation, and a low measuring tone is generated given a surface element 4 having a slight intensity deviation. Accordingly, the low measuring tones predominate, giving increasing intensity coincidence for all surface elements 4.

Since in most instances an adjustment to the differential intensity value zero is not required, but rather only a certain coincidence between rated and actual intensity distribution is strived for within the prescribable boundaries, the squared differential intensity values $(\Delta \bar{I})^2$ acquired in the squaring stage 29 are simultaneously forwarded via a switch 44 to an adder stage 45 of a threshold circuir 46. A sum value $\Sigma(\Delta \bar{I})^2$ is formed in the adder stage 45 by respective addition of the squared differential intensity values $(\Delta \bar{I})^2$ of a measuring cycle and is deposited in an internal register of the adder stage 45. A standardized limit value $\bar{I}_g$ is loaded into a register 47 of the threshold circuit 46, this standardized limit value representing an admissible deviation of the actual intensity distribution from the desired rated intensity distribution. The sum vlaues $\Sigma(\Delta \bar{I})^2$ are compared to the prescribed limit value $\bar{I}_g$ in a comparator 48. When the sum value $\Sigma(\Delta \bar{I})^2$ falls below the prescribed limit value $\bar{I}_g$, the comparator 48 emits a control signal $S_3$ which switches the change-over 41 into the position shown with broken lines. In this case, the connection between the voltage-controlled oscillator 40 and the loudspeaker 43 is interrupted and the measuring tone dependent on the squared differential value is disconnected. Instead, the loudspeaker 43 is connected via the change-over 41 and an interrupted 49 to an oscillator 50. The oscillator 50 generates an oscillation of, for example, 500 Hz which is interrupted periodically by the interrupter 49 with, for example, a frequency of 5 Hz and is made audible in the loudspeaker 43 as a periodically interrupted, continuous measuring tone. This periodically interrupted, continuous measuring tone signifies that the desired coincidence of rated and actual intensity distributions has been achieved. In case a more precise adjustment than the adjustment prescribed by the limit value $\bar{I}_g$ momentarily input into the register 47 is desired, a correspondingly lower limit value $\bar{I}_g$ can be loaded into the register 47. The adjustment with the assistance of these limit values has the advantage that it can be prescribed by the manufacturer or user of such optical devices.

In case an adjustment of the light bundle 1 up to complete coincidence is desired, the threshold circuit 46 can be advantageously disabled by actuating the switch 44, so that the change-over 41 remains in the illustrated position. In this case, the generated measuring tone continues to depend on the squared differential values $(\Delta \bar{I})^2$, whereby the loudspeaker 43 emits a low continuous measuring tone when coincidence is reached between rated and actual intensity distribution. The manner of generating the measuring tone is not restricted to the described exemplary embodiment.

When, instead of the relative intensity distribution, the absolute intensity distribution is nonetheless of interest, the standardization stage 18 is bridged or entirely omitted, so that the output of the A/D converter 11 is directly connected to an input of the differential stage 22. The rated value memory 5 and the register 47 are then not loaded with the standardized, but rather with the absolute rated values or limit values. With the assistance of the described monitoring means, a positional adjustment of the light bundle 1 can also be advantageously undertaken in that, for instance, only those surface elements 4 of the reference plane 3 which form the cross-sectional surface of the light bundle 1 in the desired position have a rated intensity value $I_s$ allocated to them. Alternatively thereto, other sub-sets of the surface elements 4 can be interrogated in a defined sequence for the positional adjustment of the light bundle 1.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for acoustic supervision of adjustment of a light bundle with respect to its intensity distribution in a reference plane which is at right angles to an optical axis of the light bundle, comprising the steps of:
   subdividing the reference plane into surface area elements, and defining and storing a desired intensity value $I_s$ for each surface area element so as to create a stored desired intensity distribution;
   measuring each of the surface area elements in a first cyclical successsion actual intensity values $I_i$ resulting at each of said surface area elements as a result of illumination by the light bundle;
   calculating and storing for each of the surface area elements associated intensity deviations between said desired intensity values $I_s$ and actual intensity values $I_i$;
   successively reading out in a second cyclical succession the intensity deviations;
   generating an oscillation signal and modulating at least one parameter of the oscillation signal to create a modulated oscillation signal dependent on the associated intensity deviations; and
   converting the modulated oscillation signal into modulated audible measuring tones, said modulated audible measuring tones representing for the surface area elements a deviation of the intensity distribution from the desired intensity distribution.

2. A method according to claim 1 wherein a frequency of said second cyclical sequence is selected dependent on a desired time succession of the measuring tones, and a frequency of said first cyclical succession is selected at least as high as the frequency of said second cyclical succession.

3. A method according to claim 1 wherein said at least one parameter is selected from a parameter group consisting of frequency, amplitude, keying frequency, and pulse duty.

4. A method according to claim 1 including a step of standardizing the intensity values and then calculating said associated intensity deviations as differential intensity values.

5. A method according to claim 1 including a step of modifying said associated intensity deviations according to a given function.

6. A method according to claim 1 including steps of:
   defining a limit value which represents an allowed deviation of the intensity distribution from the desired intensity distribution in the reference plane;
   comparing the associated intensity deviations of the area elements of the reference plane to said defined limit value; and
   making audible an additional measuring tone when all intensity deviations are below said defined limit value.

7. A method according to claim 1 including steps of:
defining a limit value which represents an allowed deviation of the intensity distribution from the desired intensity distribution in the reference plane;
summing the intensity deviations of all area elements of the reference plane within each complete cycle of said second cyclical succession;
comparing a sum of the intensity deviations to said defined limit value; and
when said defined limit value is crossed by the sum of the intensity deviations, providing an additional measuring tone.

8. A method according to claim 1 including the steps of:
standardizing said desired intensity values $I_s$; and
standardizing said actual intensity values $I_i$.

9. A method for acoustic supervision of adjustment of a light bundle with respect to its intensity distribution in a reference plane which is at right angles to an optical axis of the light bundle, comprising the steps of:
subdividing the reference plane into surface area elements, and defining and storing a desired intensity value $I_s$ for each surface area element so as to create a stored desired intensity distribution;
measuring each of the surface area elements in a first cyclical succession actual intensity values $I_i$ resulting at each of said surface area elements as a result of illumination by the light bundle and simultaneously reading out the desired intensity values $I_s$ from the surface area elements;
calculating and storing for each of the surface area elements associated intensity deviations between said desired intensity values $I_s$ and actual intensity values $I_i$;
successively reading out in a second cyclical succession the stored intensity deviations; and
generating an audible oscillation signal and modulating a frequency of the oscillation signal to create a modulated oscillation signal dependent on a magnitude of each of the associated intensity deviations.

10. An apparatus for acoustic supervision of adjustment of a light bundle with respect to its intensity distribution in a reference plane which is at right angles to an optical axis of the light bundle, said reference plane being subdivided into surface elements, comprising:
(a) an opto-electronic measuring installation means for measuring actual intensity values $I_i$ at surface elements of the reference plane;
(b) a multiplexer means connected to the measuring installation means for cyclical, successive connection through of the actual intensity values $I_i$;
(c) an A/D converter means connected to the multiplexer means for digitization of the actual intensity values $I_i$;
(d) a rated value memory means for deposit of desired intensity values $I_s$ for the surface elements of the reference plane so as to create a stored desired intensity distribution;
(e) an identification stage means connected to the rated value memory means and to the A/D converter means for identification of intensity deviations $\Delta I$ between the desired intensity values $I_s$ and the actual intensity values $I_i$ for the surface elements;

(f) a buffer memory means connected to the identification stage means for intermediate storage of the intensity deviations $\Delta I$;
(g) a D/A converter means communicating with the buffer memory means for formation of analog intensity deviations;
(h) an oscillation generator means connected to the D/A converter means and controlled by the intensity deviations for generating an oscillation of which at least one parameter is modified dependent on the intensity deviations;
(i) an electro-acoustical transducer means connected to the oscillation generator means for converting into a measuring tone the oscillation whose at least one parameter is modified;
(j) a first control generator means connected to the multiplexer means, to the rated value memory means, and to the buffer memory means for connection through of the actual intensity values $I_i$, for read-out of the desired intensity values $I_s$ from the rated value memory means, and for writing the intensity deviations $\Delta I$ into the buffer memory means; and
(k) a second control generator means connected to the buffer memory means for reading out the intermediately stored intensity deviations $\Delta I$.

11. An apparatus according to claim 10 wherein the oscillation generator means comprises a voltagecontrolled oscillator means for modifying a frequency of the generated oscillation dependent on the intensity deviations $\Delta I$.

12. An apparatus according to claim 10 wherein said identification stage means is designed as a differentiation stage.

13. An apparatus according to claim 10 wherein a modification stage means for modification of the intensity deviations $\Delta I$ according to a prescribed function is connected between the identification stage means and the buffer memory means.

14. An apparatus according to claim 10 wherein a standardization stage means is arranged between the A/D converter means and the identification stage means for standardization of the actual intensity values $I_i$.

15. An apparatus according to claim 10 further including:
(a) a threshold circuit means connected to supply to the oscillation generator means a control signal $S_3$ when the intensity deviations $\Delta I$ fall below a given limit value $I_g$; and
(b) the oscillation generator means comprising means for generating an additional tone and switch means actuatable by the control signal $S_3$ for connection through of the additional tone to the electro-acoustic transducer means so that the additional tone becomes audible given crossing of the limit value $I_g$.

16. An apparatus according to claim 15 wherein the threshold circuit means comprises an adder stage means for adding up the intensity deviations $\Delta I$, a register means for storing the limit value $I_g$, and a comparator means connected to the adder stage means and to the register means for formation of the control signal $S_3$.

17. An apparatus according to claim 15 wherein means are provided for disconnecting the threshold circuit means.

* * * * *